US006853362B2

(12) United States Patent
Bu

(10) Patent No.: US 6,853,362 B2
(45) Date of Patent: Feb. 8, 2005

(54) METHOD AND RELATED APPARATUS FOR DRIVING AN LCD MONITOR WITH A CLASS-A OPERATIONAL AMPLIFIER

(75) Inventor: Lin-Kai Bu, Tai-Nan (TW)

(73) Assignee: Himax Technologies, Inc., Hsinhua (TW)

( * ) Notice: Subject to any disclaimer, the term of this patent is extended or adjusted under 35 U.S.C. 154(b) by 256 days.

(21) Appl. No.: 10/064,211

(22) Filed: Jun. 21, 2002

(65) Prior Publication Data

US 2003/0112386 A1 Jun. 19, 2003

(30) Foreign Application Priority Data

Dec. 19, 2001 (TW) ....................................... 90131562 A

(51) Int. Cl.[7] .......................... G09G 3/36; G06F 15/167

(52) U.S. Cl. ......................... 345/96; 345/100; 345/545; 345/209

(58) Field of Search ........................ 345/87, 90, 92–93, 345/95–96, 98, 100, 209, 545

(56) References Cited

U.S. PATENT DOCUMENTS 5,790,200 A * 8/1998 Tsujimoto et al. .......... 348/545
5,874,949 A * 2/1999 Furukawa ................... 345/213
5,953,070 A * 9/1999 Liu et al. ..................... 348/525
6,201,522 B1 * 3/2001 Erhart et al. .................. 345/96
6,335,721 B1 * 1/2002 Jeong ......................... 345/100
6,518,708 B2 * 2/2003 Aso ........................ 315/169.1
6,518,947 B1 * 2/2003 Kim ........................... 345/100
6,567,066 B1 * 5/2003 Hashimoto .................. 345/100
6,628,256 B2 * 9/2003 Nishimura ................... 345/96

* cited by examiner

*Primary Examiner*—Regina Liang
*Assistant Examiner*—Duc Q Dinh
(74) *Attorney, Agent, or Firm*—Winston Hsu

(57) ABSTRACT

A method for driving an LCD with class-A operational amplifiers. The LCD has a positive operational amplifier for driving pixels with positive voltages, a negative operational amplifier for driving pixels with negative voltages, and a detector. The method includes using the detector to determine which operational amplifier is to be used to drive a next pixel. If the next pixel need be displayed with a positive voltage, then the positive operational amplifier is used to drive the next pixel. If the next pixel need be displayed with a negative voltage, then the negative operational amplifier is used to drive the next pixel.

17 Claims, 17 Drawing Sheets

METHOD AND RELATED APPARATUS FOR DRIVING AN LCD MONITOR WITH A CLASS-A OPERATIONAL AMPLIFIER

BACKGROUND OF INVENTION

1. Field of the Invention

The present invention relates to a method and a related apparatus for driving an LCD monitor, and more particularly, to a method and a related apparatus of applying class-A operational amplifiers for driving the LCD monitor.

2. Description of the Prior Art

The advantages of a liquid crystal display (LCD) include lighter weight, less electrical consumption, and less radiation contamination. Thus, the LCD monitors have been widely applied to several portable information products, such as notebooks, PDAs, etc. The LCD monitors gradually replace the CRT monitors of the conventional desktop computers. Incident light will produce different polarization or refraction effects when the alignment of liquid crystal molecules is altered. The transmission of the incident light is affected by the liquid crystal molecules, and magnitude of the light emitting out of liquid crystal molecules varies. The LCD monitor utilizes the characteristics of the liquid crystal molecules to control the corresponding light transmittance and produces gorgeous images according to different magnitude of red, blue, and green light.

Please refer to FIG. 1, which is a diagram of a prior art thin film transistor (TFT) LCD monitor 10. The LCD monitor 10 has an LCD panel 12, a controller 14, a first driving circuit 16, a second driving circuit 18, a first voltage generator 20, and a second voltage generator 22. The LCD panel 12 is constructed by two parallel substrates. There is an LCD layer stuffed into space between these two substrates. A plurality of data lines 24, a plurality of gate lines 26 that are perpendicular to the data lines 24, and a plurality of thin film transistors 28 are positioned on one of the substrates. There is a common electrode installed on another substrate, and the first voltage generator 20 is electrically connected to the common electrode for outputting a common voltage Vcom via the common electrode. Please note that only four thin film transistors 28 are shown in FIG. 1 for clarity. Actually, the LCD panel 12 has one thin film transistor 28 installed in each intersection of the data lines 24 and gate lines 26. In other words, the thin film transistors 28 are arranged in a matrix format on the LCD panel 12. The data lines 24 correspond to different columns, and the gate lines 26 correspond to different rows. The LCD monitor 10 uses a specific column and a specific row to locate the associated thin film transistor 28 that corresponds to a pixel. In addition, the structure of the LCD panel 12, that is, two substrates with one LCD layer is equivalent to a capacitor 30. The substrates function as conductive plates, and the stuffed LCD layer functions as a dielectric.

The operation of the prior art LCD monitor 10 is described as follows. When the controller 14 receives a horizontal synchronization signal 32 and a vertical synchronization signal 34, the controller 14 generates corresponding control signals respectively inputted into the first driving circuit 16 and the second driving circuit 18. The first driving circuit 16 and the second driving circuit 18 then generate input signals to the LCD panel 12 for turning on the corresponding thin film transistors 28 so that a voltage difference will be kept by the capacitors 30. For example, the second driving circuit 18 outputs a pulse to the gate line 26 for turning on the thin film transistor 28. Therefore, the voltage of the input signal generated by the first driving circuit 16 is inputted into the capacitor 30 through the data line 24 and the thin film transistor 28. The voltage difference kept by the capacitor 30 can further adjust a corresponding gray level of the related pixel through affecting the related alignment of liquid crystal molecules positioned inside the LCD layer. In addition, the first circuit 16 generates the input signals, and magnitude of each input signal inputted to the data line 24 is controlled by the second voltage generator 22. Different voltage levels generated by the second voltage generator 22, therefore, correspond to different gray levels.

If the LCD monitor 10 continuously uses a positive voltage to drive the liquid crystal molecules, the liquid crystal molecules will not quickly change a corresponding alignment according to the applied voltages as before. Thus, the incident light will not produce accurate polarization or refraction, and the quality of images displayed on LCD monitor 10 deteriorates. Similarly, if the LCD monitor 10 continuously uses a negative voltage to drive the liquid crystal molecules, the liquid crystal molecules will not quickly change a corresponding alignment according to the applied voltages as before. Thus, the incident light will not produce accurate polarization or refraction, and the quality of images displayed on the LCD monitor 10 deteriorates. In order to protect the liquid crystal molecules from being irregular, the LCD monitor 10 must alternately use the positive and the negative voltage to drive the liquid crystal molecules. In addition, not only does the LCD panel 12 have the capacitors 30, but also the related circuit will have some parasite capacitors owing to its intrinsic structure. When the same image is displayed on the LCD panel 12 for a long time, the parasite capacitors will be charged to generate a residual image effect. The residual image with regard to the parasite capacitors will further distort next images displayed on the same LCD panel 12. Therefore, the LCD monitor 10 must alternately use the positive and the negative voltage to drive the liquid crystal molecules for eliminating the bothering residual image effect. However, when the LCD monitor 10 alternately uses the positive and negative voltage to drive the liquid crystal molecules, the image displayed will flicker owing to a voltage offset generated by the thin film transistor 28. The reason is described as follows.

Please refer to FIG. 2, which is an output voltage diagram of the second voltage generator 22 shown in FIG. 1. As with the voltages V0, V1, V2, V3, V4, V5, V6, V7, V8, V9 shown in FIG. 2, the second voltage generator 22 generates different voltages according to display data 36 for driving the thin film transistors 28 positioned on the LCD panel 12. However, when the thin film transistor 28 is turned on, the voltage difference between the input terminal and the output terminal of the thin film transistor 28 is equal to a deviation Vd. Therefore, the actual values of voltages such as V20, V21, V22, V23, V24, V25, V26, V27, V28, V29 imposed on the LCD panel 12 are individually lower than the corresponding ideal values of voltages such as V0, V1, V2, V3, V4, V5, V6, V7, V8, V9. As mentioned above, the LCD monitor 10 alternatively uses the positive and negative voltages to drive each pixel on the LCD panel 12. In other words, the voltage outputted from the second voltage generator 22 is changed so that the voltage difference between the voltage outputted from the second voltage generator 22 and the common voltage Vcom generated by the first voltage generator 20 has an alternating polarity. For example, the display data 36 indicates that a voltage difference V1−Vcom is required to drive one pixel, and the pixel will hold the voltage difference V1−Vcom during a predetermined interval. Because the pixel is alternatively driven with the positive and negative voltages, the positive voltage V1−Vcom and the negative voltage (Vcom−V8) are alternatively imposed on the LCD panel 12. However, the actual voltage V21−Vcom is not equal to the voltage Vcom−V28 owing to the deviation Vd of the thin film transistor 28. Therefore, when the pixel is alternatively driven with the positive voltage V21−Vcom and the negative voltage (Vcom−V28), the pixel flickers because of an unstable gray level.

Please refer from FIG. 3A to FIG. 6B. FIG. 3A and FIG. 3B are diagrams of a prior art line inversion driving method. FIG. 4A and FIG. 4B are diagrams of a prior art column inversion driving method. FIG. 5A and FIG. 5B are diagrams of a prior art dot inversion driving method. FIG. 6A and FIG. 6B are diagrams of a prior art two-dot line inversion driving method. In order to solve the mentioned problem when the LCD monitor 10 alternatively uses the positive and negative voltages to driving the liquid crystal molecules, the LCD monitor 10 adopts the line inversion driving method, the column inversion driving method, the dot inversion driving method, or the two-dot line inversion driving method to eliminate the image flickers. In the drawings from FIG. 3A to FIG. 6B, a first image frame 42 and a second image frame 44 are two successive image frames. The polarity of the pixel 46 in the first image frame 42 is opposite to the polarity of the same pixel 46 in the second image frame 44. In addition, the line inversion driving method, the column inversion driving method, the dot inversion driving method, and the two-dot line inversion driving method are classified according to different polarity arrangements of pixels 46. As shown in FIG. 3A to FIG. 6B, the line inversion driving method can eliminate image flickers along the vertical direction, and the column inversion driving method can eliminate image flickers along the horizontal direction. Similarly, the dot inversion driving method and the two-dot line inversion driving method both can eliminate image flickers along the vertical direction and the horizontal direction simultaneously for improving corresponding image quality.

Please refer to FIG. 5A, FIG. 5B, and FIG. 7. FIG. 7 is a voltage diagram of the dot inversion driving method shown in FIG. 5A and FIG. 5B. For the pixels 47 positioned in different rows 50, 52, 54, 56 but the same column 48, the polarities of the pixels 47 in the first image frame 42 are "positive", "negative", "positive", and "negative" respectively. Therefore, a class-A operational amplifier buffer is used for pulling up voltages of the pixels 47 in rows 50, 54 so that the pixels 47 will have the same positive polarity. Similarly, another class-A operational amplifier buffer is used for pushing down voltages of the pixels 47 in rows 52, 56 so that the pixels 47 will have the same negative polarity. In other words, the prior art dot inversion driving method must use one class-A operational amplifier buffer for driving pixels with positive polarities, and another class-A operational amplifier buffer for driving pixels with negative polarities.

Please refer to FIG. 6A, FIG. 6B, and FIG. 8. FIG. 8 is a voltage diagram of the two-dot line inversion driving method shown in FIG. 6A and FIG. 6B. For the pixels 47 positioned in different rows 50, 52, 54, 56 but the same column 48, the polarities of the pixels 47 in rows 50, 52, 54, 56 within the first image frame 42 are "positive", "positive", "negative", and "negative" respectively. Therefore, a class-AB operational amplifier buffer must be used for pulling up and pushing down voltages of each pixel 47 in rows 50, 52 so that the pixels 47 will have the same positive polarity. Similarly, another class-AB operational amplifier buffer must be used for pushing down and pulling up voltages of each pixel 47 in rows 54, 56 so that the pixels 47 will have the same negative polarity. In other words, the prior art two-dot line inversion driving method must use one class-AB operational amplifier buffer for driving two successive pixels with the same positive polarity, and another class-AB operational amplifier buffer for driving two successive pixels with the same negative polarity.

When the dot inversion driving method encounters a flicker pattern, the two-dot line inversion driving method is used for handling the flicker pattern to reduce the related flicker problem. Please refer to FIG. 5A, FIG. 5B, FIG. 6A, and FIG. 6B. As shown in FIG. 5A and FIG. 5B, the pixels 47 are divided into two groups, that is, the pixels 47 with circle symbols, and the pixels 47 without circle symbols. Concerning the flicker pattern, the pixels 47 with circle symbols have an identical gray level equivalent to 0 volts, and the polarity of each pixel 47 with a circle symbol will not change in both image frames 42, 44 according to the dot inversion driving method. On the contrary, all of the pixels 47 without circle symbols will change polarities from "negative" to "positive" according to the dot inversion driving method. However, only the pixels without circle symbols will change polarities in different image frames 42, 44, and the pixels without circle symbols have the same polarity in each frame 42, 44. Therefore, the flicker pattern with regard to the above-mentioned dot inversion driving method is equivalent to pixels driven according to a prior art frame inversion driving method. In other words, all of the pixels 47 without circle symbols in the first image frame 42 have the same negative polarity, and all of the pixels 47 without circle symbols in the second image frame 42 have the same positive polarity. Therefore, a flicker problem generated owing to this display pattern. Therefore, the two-dot line inversion driving method is adopted for solving the flicker problem mentioned above. Please refer to FIG. 6A and FIG. 6B. The pixels 47 with circle symbols will not change polarities in the first and second image frames 42, 44, but the pixels 47 without circle symbols will. For the pixels 47 without circle symbols shown in FIG. 6A, each pixel 47 has its specific polarity such as a positive polarity or a negative polarity. It is the same for the pixels 47 without circle symbols shown in FIG. 6B, and the pixels 47 without circle symbols will generate "mixed" polarity transitions among adjacent pixels 47 between the first and second image frames 42, 44 to reduce the flicker problem mentioned above.

As mentioned above, with regard to the dot inversion driving method, the prior art LCD monitor 10 adopts the class-A operational amplifier buffer to drive pixels. However, in the two-dot line inversion, the prior art LCD monitor 10 has to adopt the class-AB operational amplifier buffer to drive pixels. Though the flicker pattern does not occur frequently, the prior art LCD monitor 10 still requires the class-AB operational amplifier buffer to handle the possible flicker pattern. Therefore, the prior art LCD monitor 10 can not only use class-A operational amplifiers buffer to drive pixels according to the dot inversion driving method and the two-dot line inversion driving method.

SUMMARY OF INVENTION

It is therefore a primary objective of the claimed invention to provide a method for driving the LCD monitor with an class-A operational amplifier in a multiple-dot line inversion driving mode.

Briefly, the claimed invention provides a driving method of a liquid crystal display (LCD) monitor. The LCD monitor comprises an LCD panel for displaying a plurality of pixels arranged in a matrix format, a positive buffer circuit for driving the pixels with a positive voltage, a negative buffer circuit for driving the pixels with a negative voltage, a detector for receiving a horizontal synchronization signal and a polarity signal, and for comparing states of the polarity signal at two successive triggers of the horizontal synchronization signal, and a controller connected to the detector, the positive buffer circuit, and the negative buffer circuit for controlling operation of the positive buffer circuit and the negative buffer circuit according to an output of the detector. The driving method comprises using the controller to control either the positive buffer circuit or the negative buffer circuit for driving two adjacent pixels, which are located in the same column but different rows on the LCD panel corresponding to the two successive triggers of the horizontal synchronization signal, with voltages of the same polarity when the detector detects that states of the polarity signal at two successive triggers of the horizontal synchronization signal are the same so that the positive buffer circuit continuously drives the pixels with the positive voltage and the negative buffer circuit continuously drives the pixels with the negative voltage. The driving method also comprises using the controller to control the positive buffer circuit and the negative buffer circuit for driving two adjacent pixels, which are located in the same column but different rows on the LCD panel corresponding to two successive triggers of the horizontal synchronization signal, with voltages of opposite polarities when the detector detects that two states of the polarity signal at two successive triggers of the horizontal synchronization signal differ.

It is an advantage of the claimed invention that the LCD monitor adopts two precharge circuits such as source followers to provide a predetermined positive level and a predetermined negative level so that two associated output buffers, which are class-A operational amplifiers, can drive two successive pixels having the same positive polarity and two successive pixels having the same negative polarity respectively according to the two-dot line inversion driving method.

These and other objectives of the claimed invention will no doubt become obvious to those of ordinary skill in the art after reading the following detailed description of the preferred embodiment which is illustrated in the various figures and drawings.

DETAILED DESCRIPTION

Figure 9:
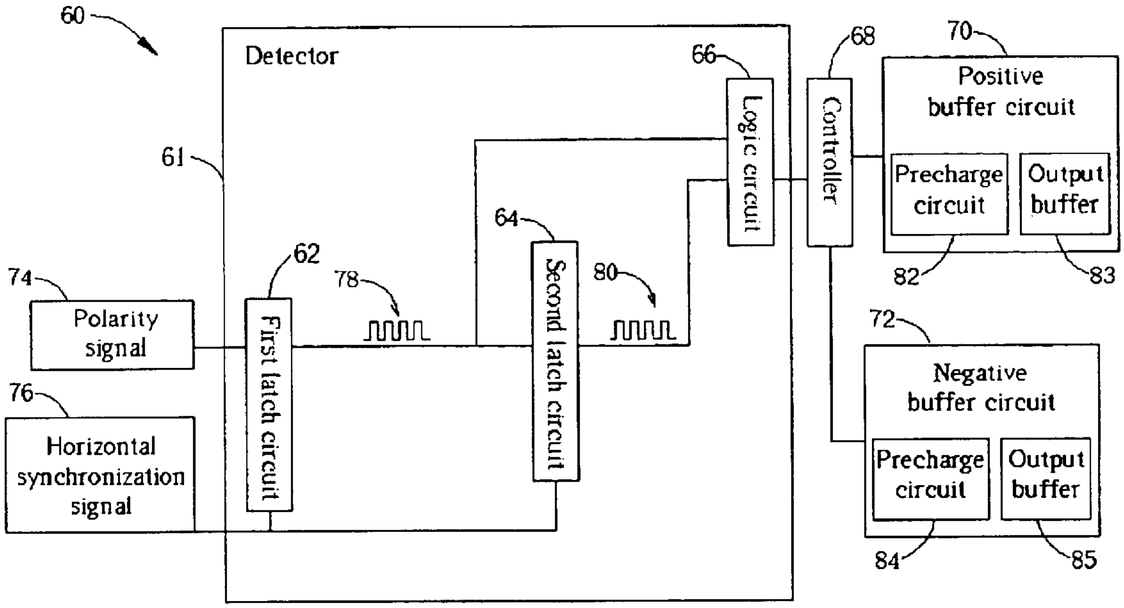
FIG. 9 is a block diagram displaying a driving circuit of an LCD monitor according to the present invention.
Figure 10:
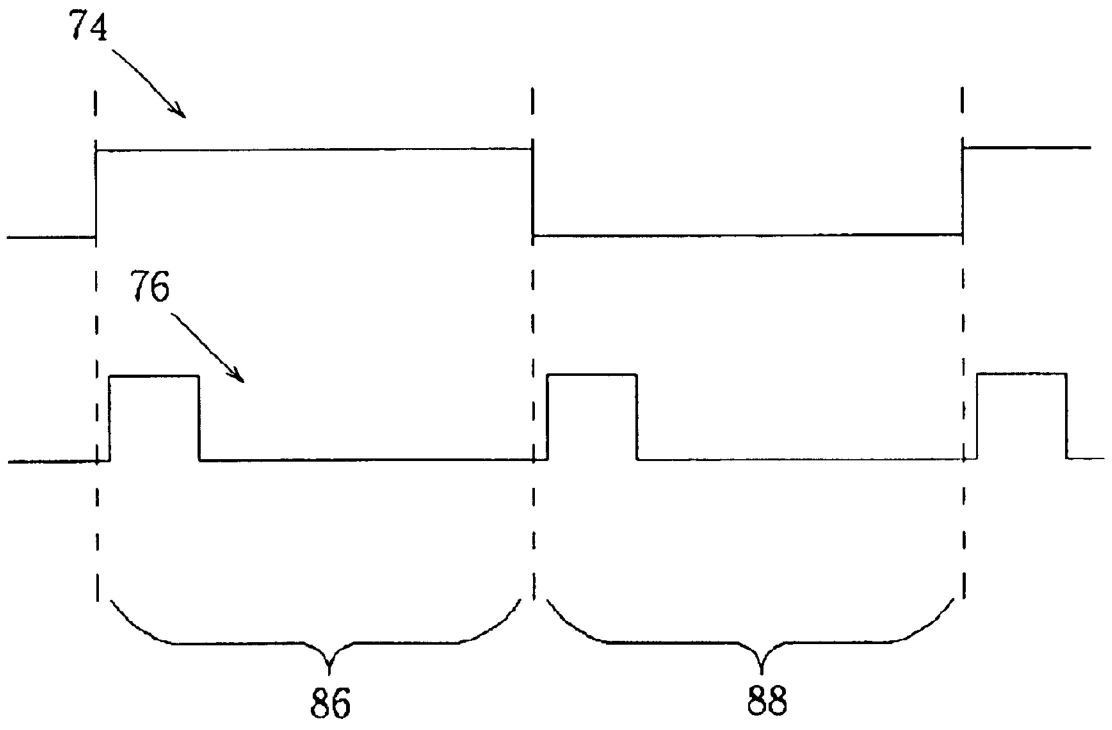
Fig. 10 Prior art
FIG. 10 is a waveform diagram displaying a polarity signal and a horizontal synchronization signal according to the prior art dot inversion driving method.
Figure 11:
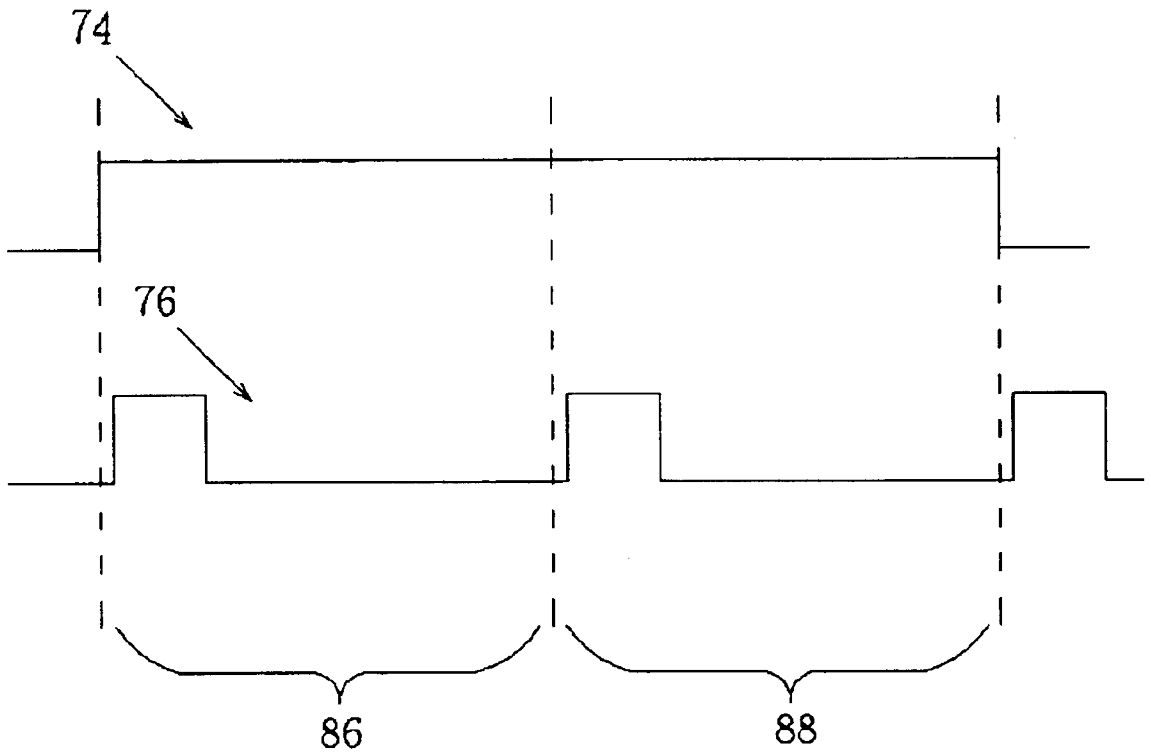
Fig. 11 Prior art
FIG. 11 is a waveform diagram displaying the polarity signal and the horizontal synchronization signal according to the prior art two-dot line inversion driving method.

Please refer from FIG. 9 to FIG. 11. FIG. 9 is a block diagram illustrating a driving circuit 60 of an LCD monitor according to the present invention. FIG. 10 is a waveform diagram showing a polarity signal 74 and a horizontal synchronization signal 76 according to the prior art dot inversion driving method. FIG. 11 is a waveform diagram showing the polarity signal 74 and the horizontal synchronization signal 76 according to the prior art two-dot line inversion driving method. The driving circuit 60 has a detector 61, a controller 68, a positive buffer circuit 70, and a negative buffer circuit 72. The detector 61 has a first latch circuit 62, a second latch circuit 64, and a logic circuit 66. The first latch 62 generates a first output signal 78 according to a polarity signal 74 and a horizontal synchronization signal 76. The second latch circuit 64 generates a second output signal 80 according to the first output signal 78 and the horizontal synchronization signal 76. The polarity signal 74 corresponds to a polarity of one pixel positioned on the LCD panel. In addition, the logic circuit 66 will drive the controller 68 after executing a logic operation according to the first output signal 78 and the second output signal 80 so that the controller 68 can determine which one of the dot inversion method and the two-dot line inversion method is applied to drive pixels. In the preferred embodiment, the logic circuit 66 applies an exclusive-OR (XOR) logic operation on the first output signal 78 and the second output signal 80. As shown in FIG. 10, the polarity signal 74 has a binary value "1" and the horizontal synchronization signal 76 has a pulse whose voltage rises from "0" to "1" and then falls from "1" to "0". That is, the horizontal synchronization signal 76 has a binary value "1" during a first period 86. For example, when voltage level of the horizontal synchronization signal 76 rises from "0" to "1", a corresponding rising edge trigger signal is generated to trigger the first latch circuit 62 for keeping the voltage level of the polarity signal 74, and the rising edge trigger signal is also generated to trigger the second latch circuit 64 for keeping the voltage level of the first output signal 78. Therefore, the first latch circuit 62 is edge-triggered by the pulse of the horizontal synchronization signal 76 for latching the first output signal 78 at "1" according to the polarity signal 74. However, the polarity signal 74 has a binary value "0" and the horizontal synchronization signal has a pulse whose voltage level rises from "0" to "1" and then falls from "1" to "0"0 during a second period 88. Therefore, the first latch circuit 62 and the second latch circuit 64 are both edge-triggered by the pulse generated from the horizontal synchronization signal 76 during the second period 88. The first output signal 78 is previously latched at "1" during the first period 86. Thus, during the second period 88, the second output signal 80 is latched at "1" because the first output signal 78 has a value "1" and the horizontal synchronization signal 76 generates an edge trigger signal to trigger the second latch circuit 64 for keeping the voltage level of the first output signal 78, and the first output signal 78 is latched at "0" because the polarity signal 74 has a value "0" and the horizontal synchronization signal 76 generates an edge trigger signal to trigger the first latch circuit 62 for keeping the voltage level of the polarity signal 74. When the logic circuit 66 receives the first output signal 78 which has a value "1" and the second output signal 80 which has a value "0", the logic circuit 66 will output an identification signal with a corresponding value "1" so that the LCD monitor will drive pixels according to the dot inversion method.

As shown in FIG. 11, the polarity signal 74 has a binary value "1" and the horizontal synchronization signal 76 has a pulse whose voltage rises from "0" to "1" and then falls from "1" to "0". That is, the horizontal synchronization signal 76 has a binary value "1" during a first period 86. For example, when voltage level of the horizontal synchronization signal 76 rises from "0" to "1", a corresponding edge trigger signal is generated to trigger the first latch circuit 62 for keeping the voltage level of the polarity signal 74. Therefore, the first latch circuit 62 is triggered by the pulse of the horizontal synchronization signal 76 for latching the first output signal 78 at "1" according to the polarity signal 74. However, the polarity signal 74 has a binary value "1" and the horizontal synchronization signal has a pulse whose voltage level rises from "0" to "1" and then falls from "1" to "0" during a second period 88. Therefore, the first latch circuit 62 and the second latch circuit 64 are both edge-triggered by the pulse generated from the horizontal synchronization signal 76 during the second period 88. The first output signal 78 is previously latched at "1" during the first period 86. Thus, during the second period 88, the second output signal 80 is latched at "1" because the first output signal 78 has a value "1" and the horizontal synchronization signal 76 generates an edge trigger signal to trigger the second latch circuit 64 for keeping the voltage level of the first output signal 78, and the first output signal 78 is latched at "1" because the polarity signal 74 has a value "1" and the horizontal synchronization signal 76 generates an edge trigger signal to trigger the first latch circuit 62 for keeping the voltage level of the polarity signal 74. When the logic circuit 66 receives the first output signal 78 which has a value "1" and the second output signal 80 which has a value "1", the logic circuit 66 will output an identification signal with a corresponding value "0" so that the LCD monitor will drive pixels according to the two-dot line inversion method. To sum up, the detector 61 in the preferred embodiment is used for determined what kind of driving methods is currently adopted by comparing polarities of two adjacent pixels located in the same column but different rows. Then, the controller 68 is capable of controlling the positive buffer circuit 70 and the negative buffer circuit 72 to drive the pixels correctly.

The positive buffer circuit 70 has a precharge circuit 82 for providing a predetermined positive level Va to a data line, and an output buffer 83 for driving a voltage level from the predetermined positive level Va to a target positive voltage. The negative buffer circuit 72 has a precharge circuit 84 for providing a predetermined negative level Vb to a data line, and an output buffer 85 for driving a voltage level from the predetermined negative level Vb to a target negative voltage. It is noteworthy that the precharge circuits 82, 84 are source followers in the preferred embodiment for providing voltage level Va and Vb, and the output buffers 83, 85 are class-A operational amplifiers for individually outputting positive voltages and negative voltages to drive pixels. Therefore, the prior art two-dot line inversion driving method can use the class-A operational amplifier to drive pixels according to the present invention. The predetermined positive level Va is a minimal positive voltage required to drive pixels having the positive polarities, and the predetermined negative level Vb is a minimal negative voltage required to drive pixels having the negative polarities. In addition, the precharge circuits 82, 84 are used for providing predetermined voltages. Therefore, the buffer circuits 70, 72 according to the present invention also can use any circuits capable of providing predetermined voltages to replace the precharge circuits 82, 84, and the objective of the present invention is achieved under such a replacement.

Figure 1:
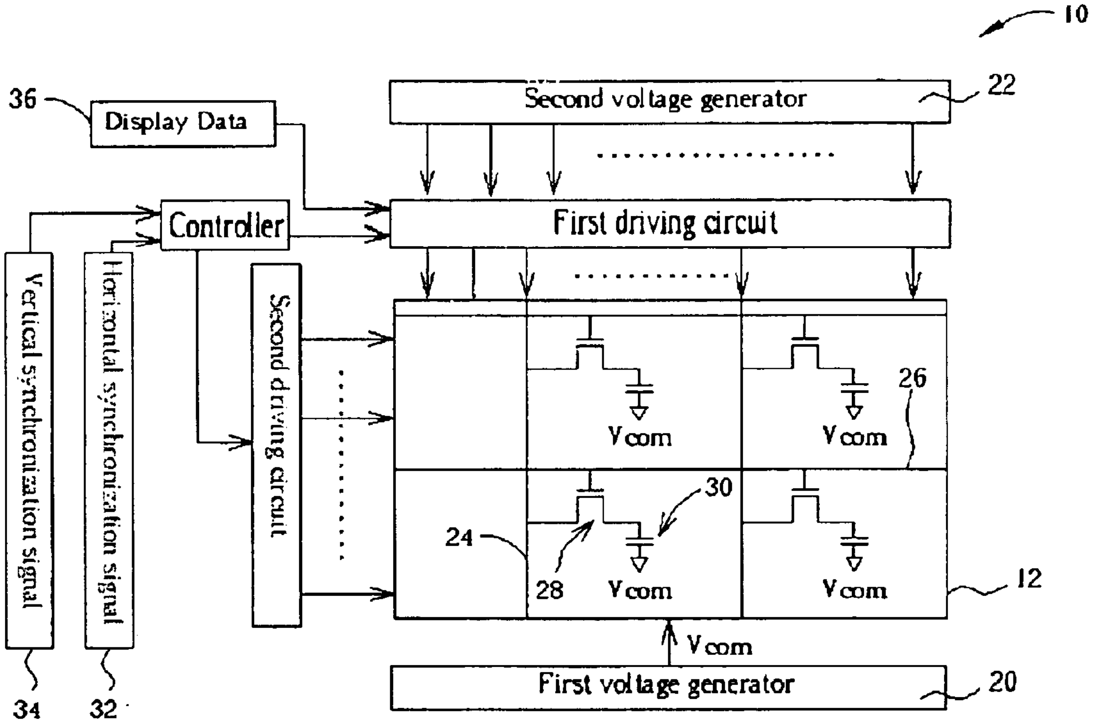
Fig. 1 Prior art
FIG. 1 is a diagram of a prior art thin film transistor (TFT) LCD monitor.
Figure 2:
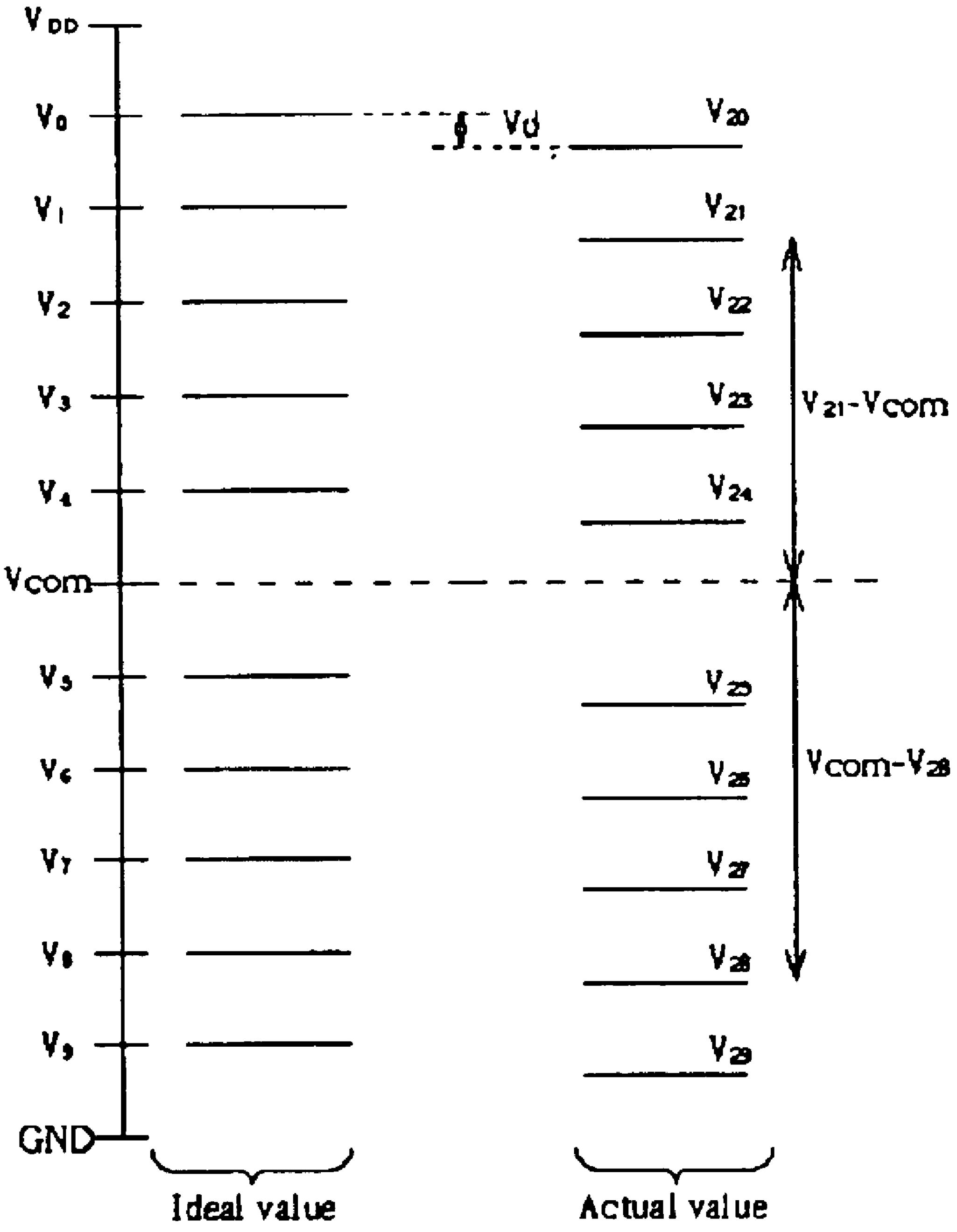
Fig. 2 Prior art
FIG. 2 is an output voltage diagram of a second voltage generator shown in FIG. 1.
Figure 3A:
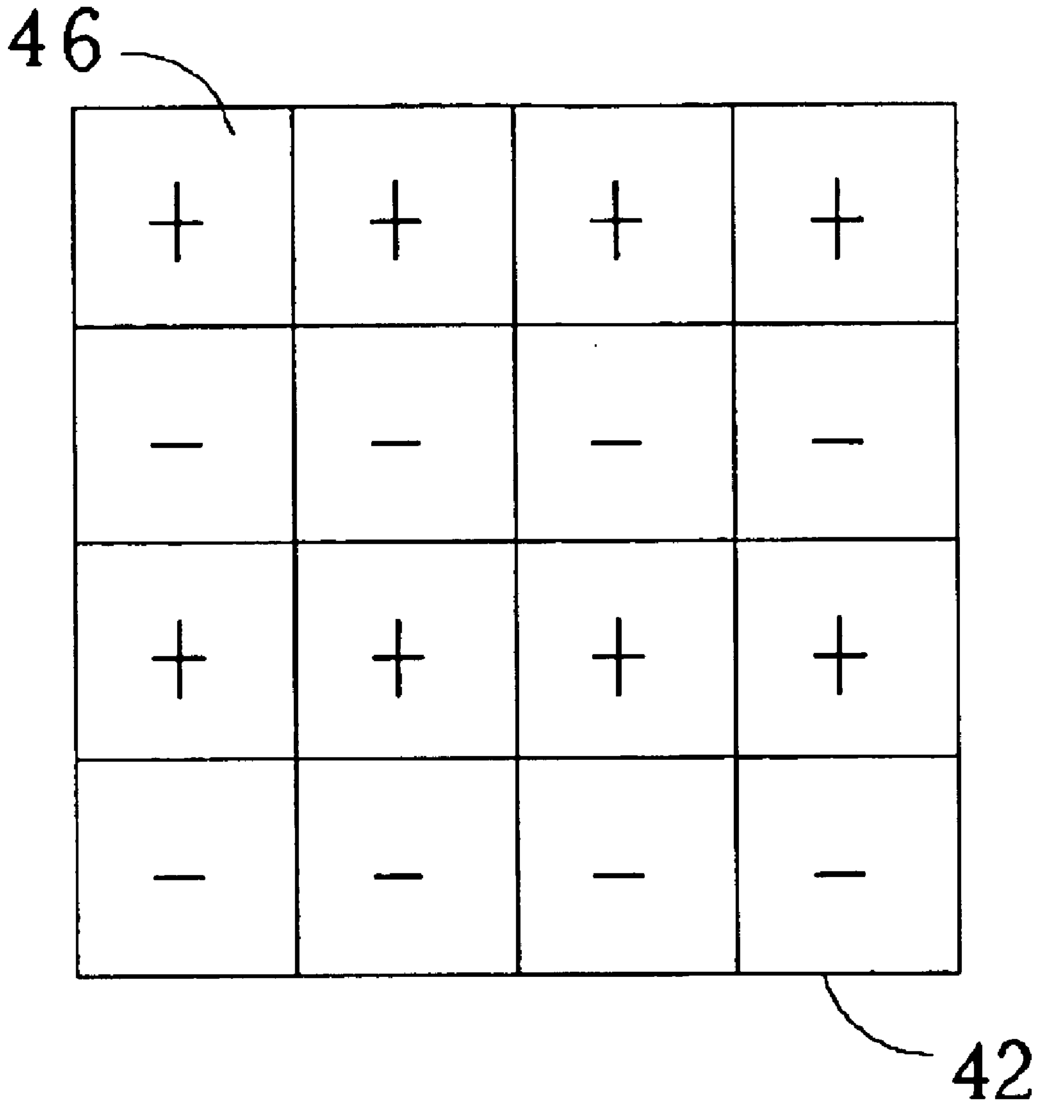
Fig. 3A Prior art
FIG. 3A and FIG. 3B are diagrams of a prior art line inversion driving method.
Figure 3B:
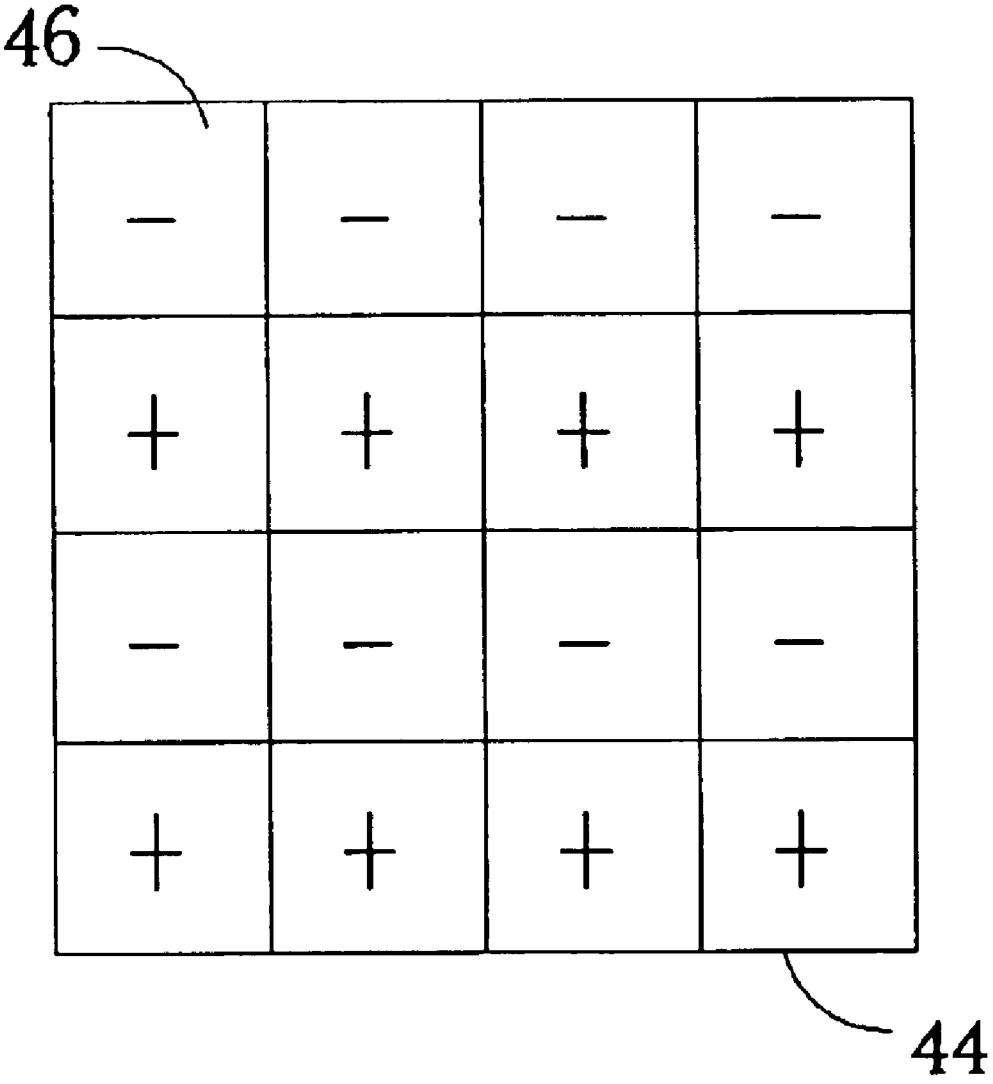
Fig. 3B Prior art
Figure 4A:
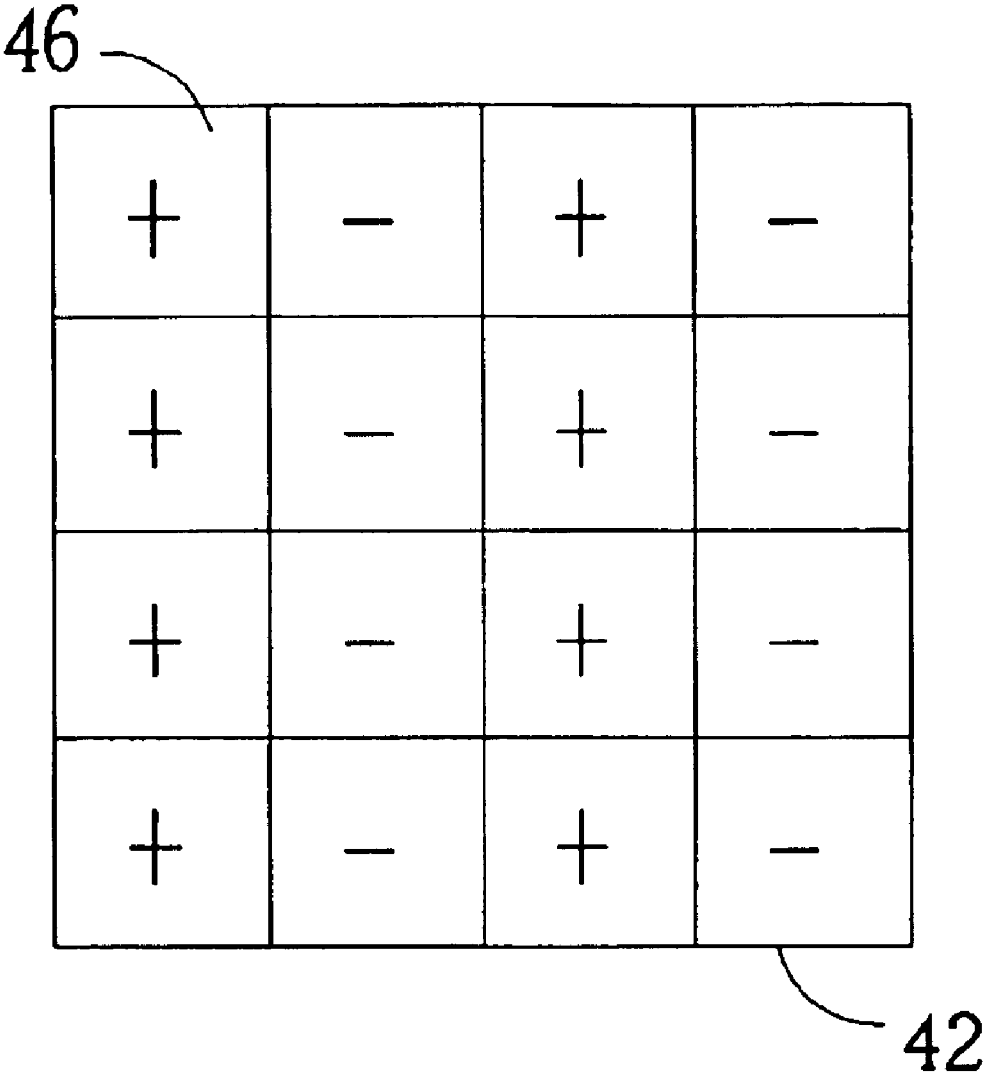
Fig. 4A Prior art
FIG. 4A and FIG. 4B are diagrams of a prior art column inversion driving method.
Figure 4B:
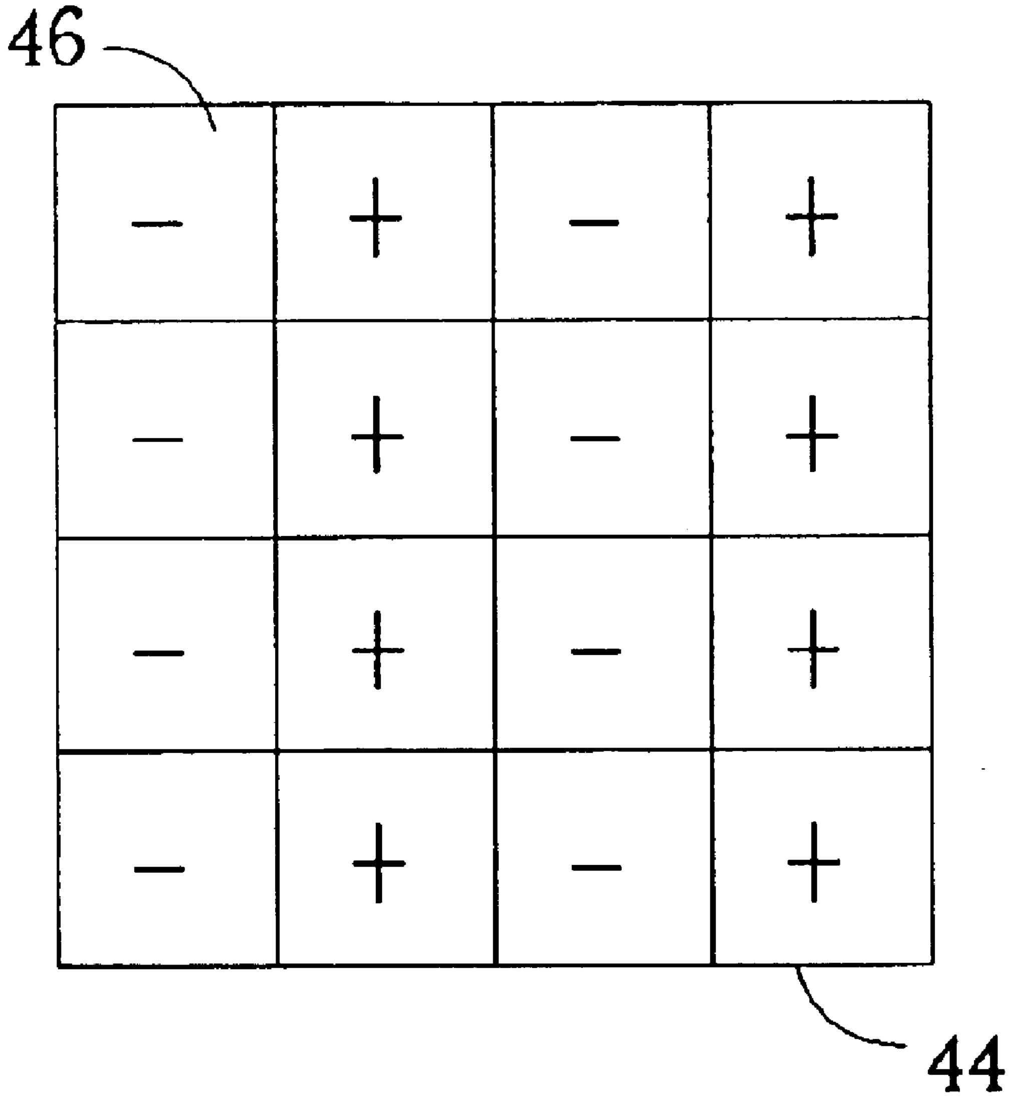
Fig. 4B Prior art
Figure 5A:
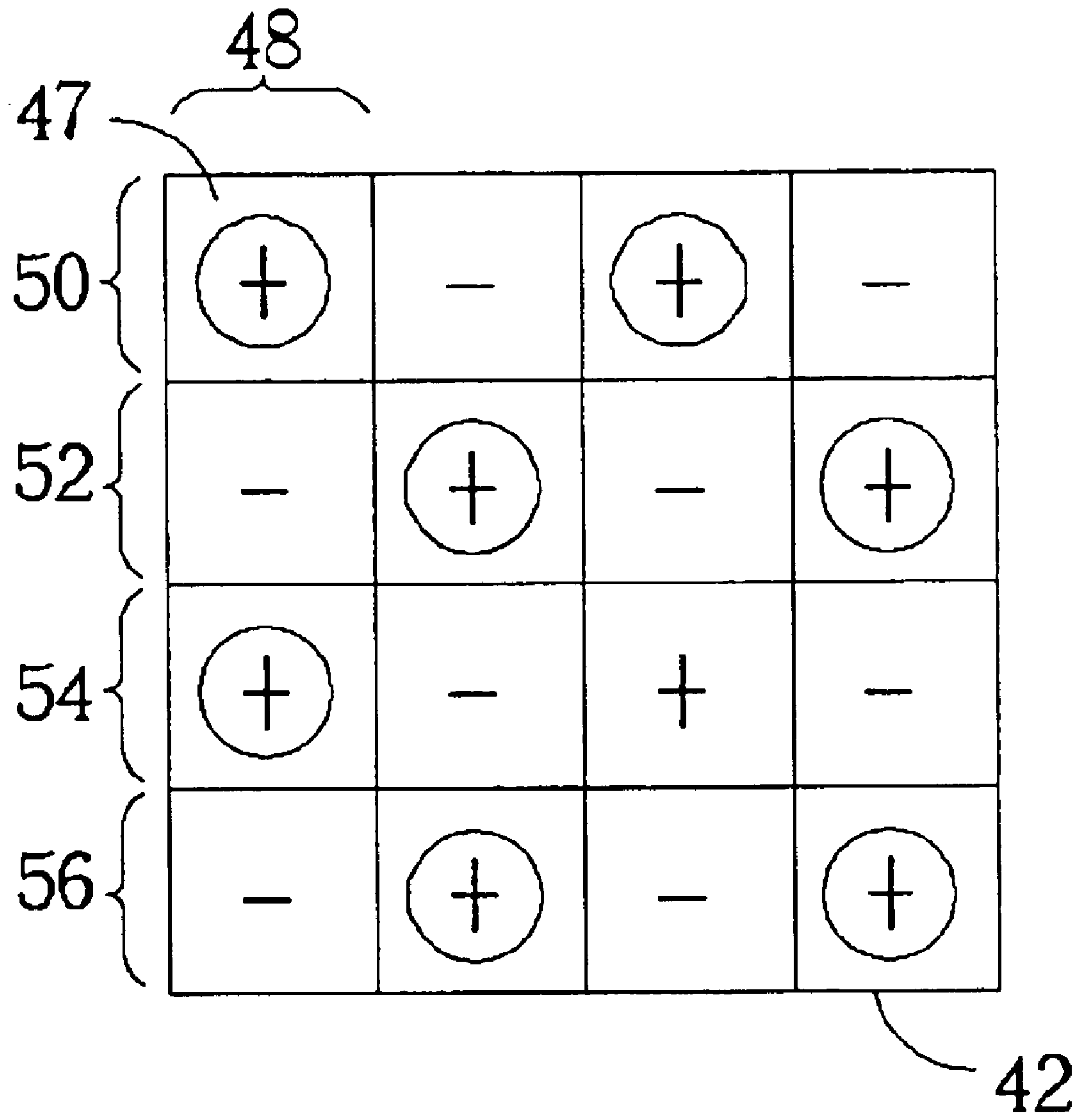
Fig. 5A Prior art
FIG. 5A and FIG. 5B are diagrams of a prior art dot inversion driving method.
Figure 5B:
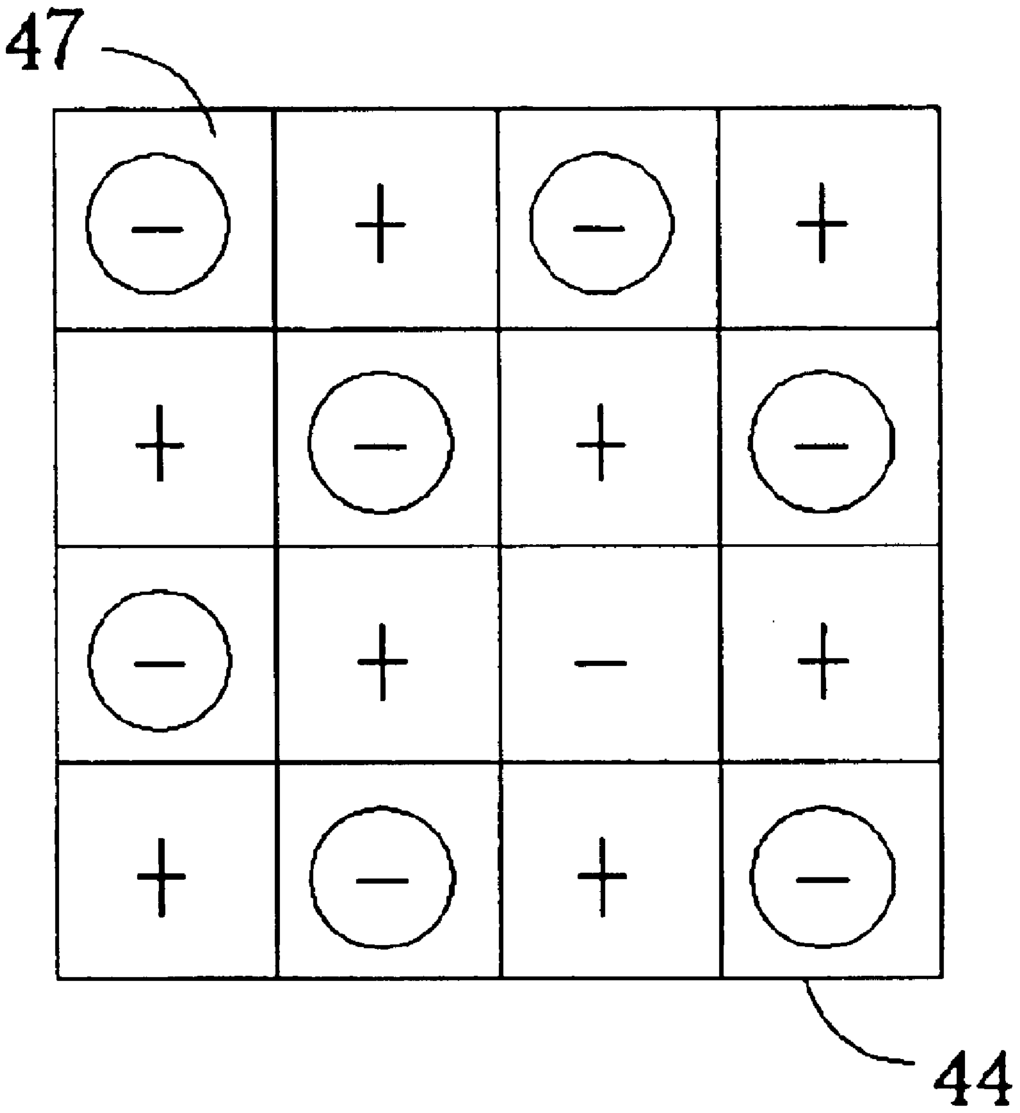
Fig. 5B Prior art
Figure 6A:
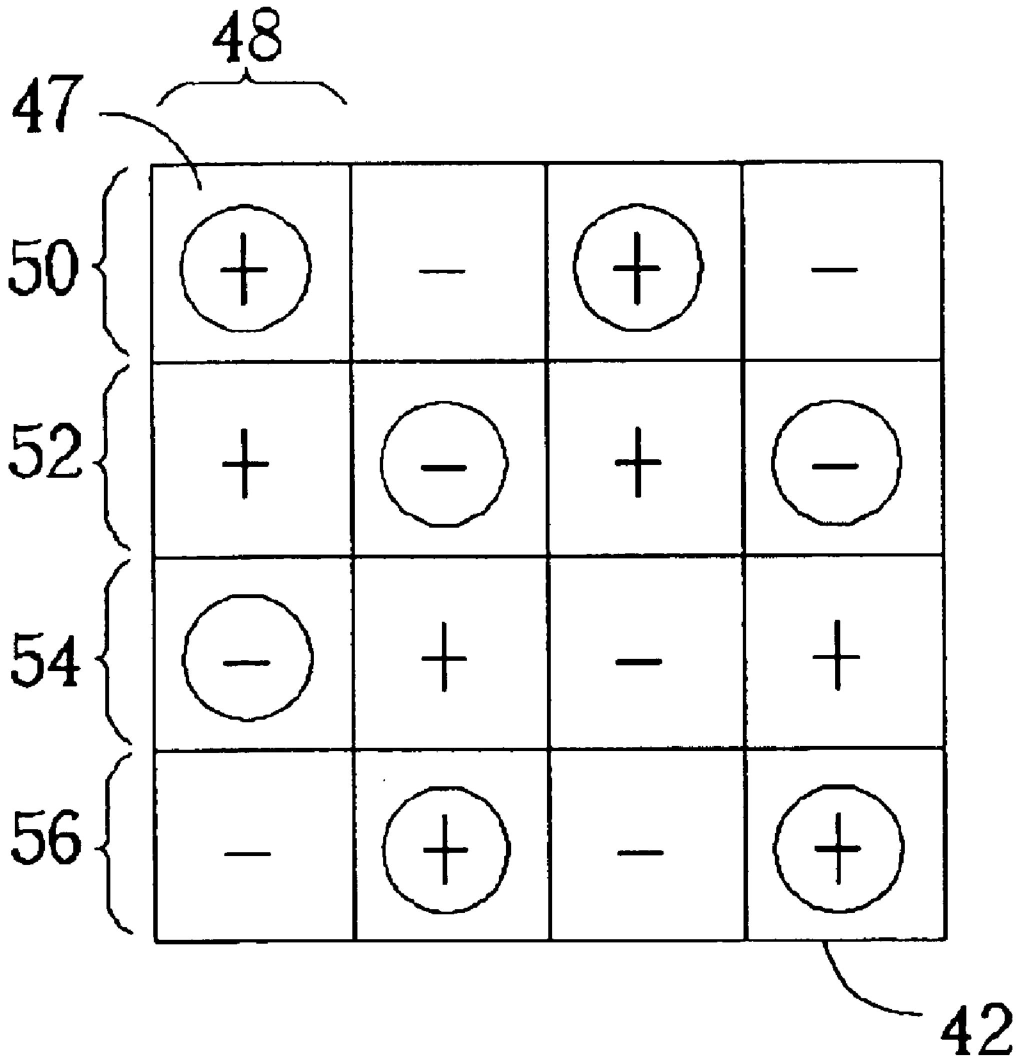
Fig. 6A Prior art
FIG. 6A and FIG. 6B are diagrams of a prior art two-dot line inversion driving method.
Figure 6B:
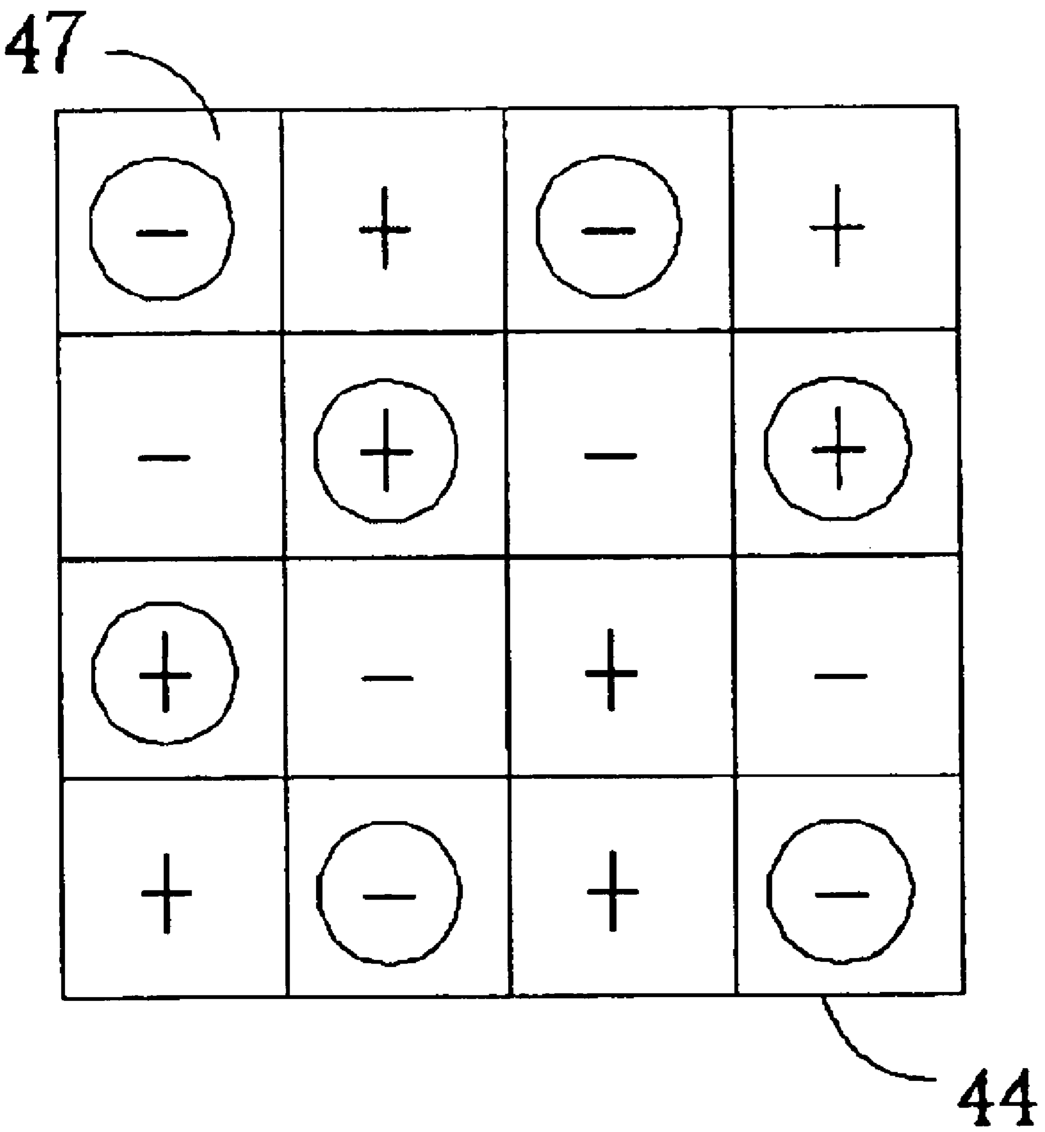
Fig. 6B Prior art
Figure 7:
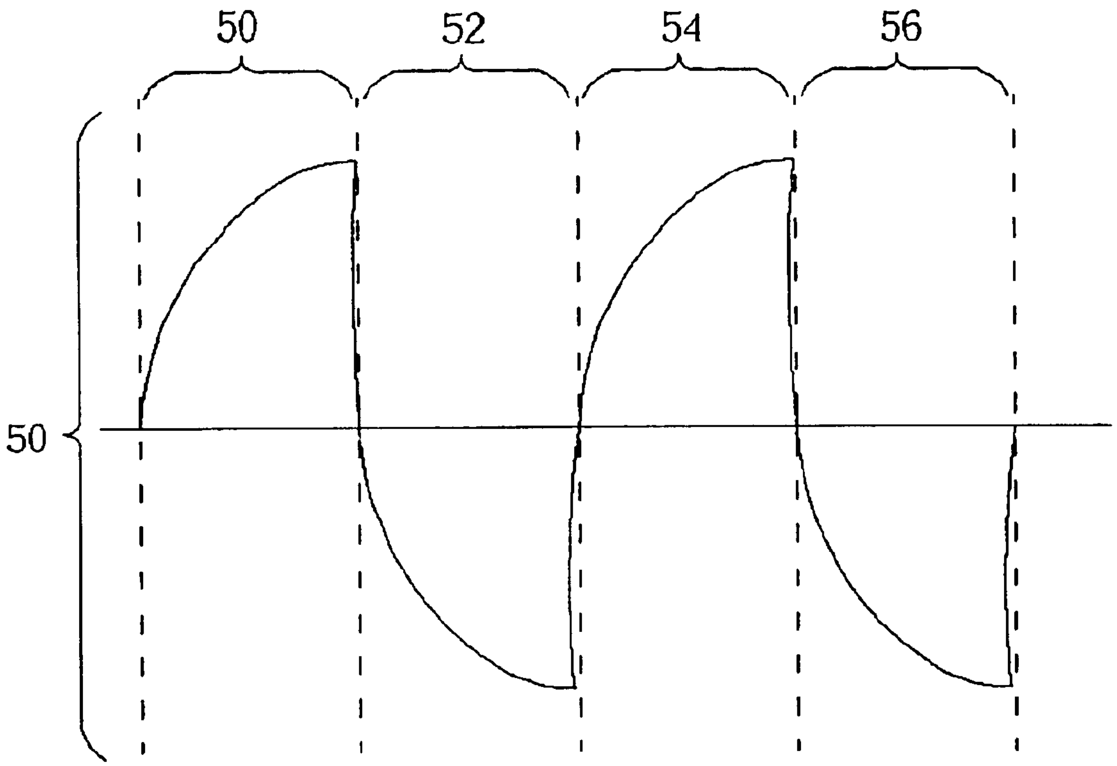
Fig. 7 Prior art
FIG. 7 is a voltage diagram of the dot inversion driving method shown in FIG. 5A and FIG. 5B.
Figure 8:
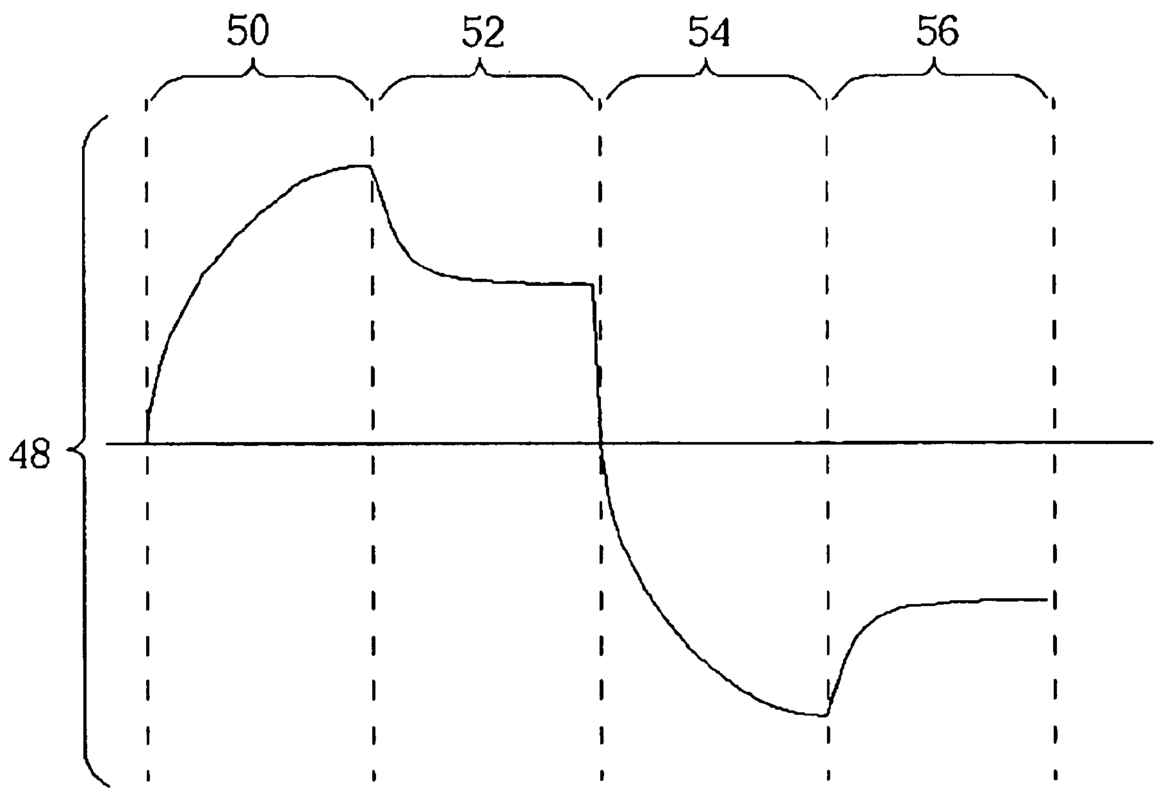
Fig. 8 Prior art
FIG. 8 is a voltage diagram of the two-dot line inversion driving method shown in FIG. 6A and FIG. 6B.
Figure 12:
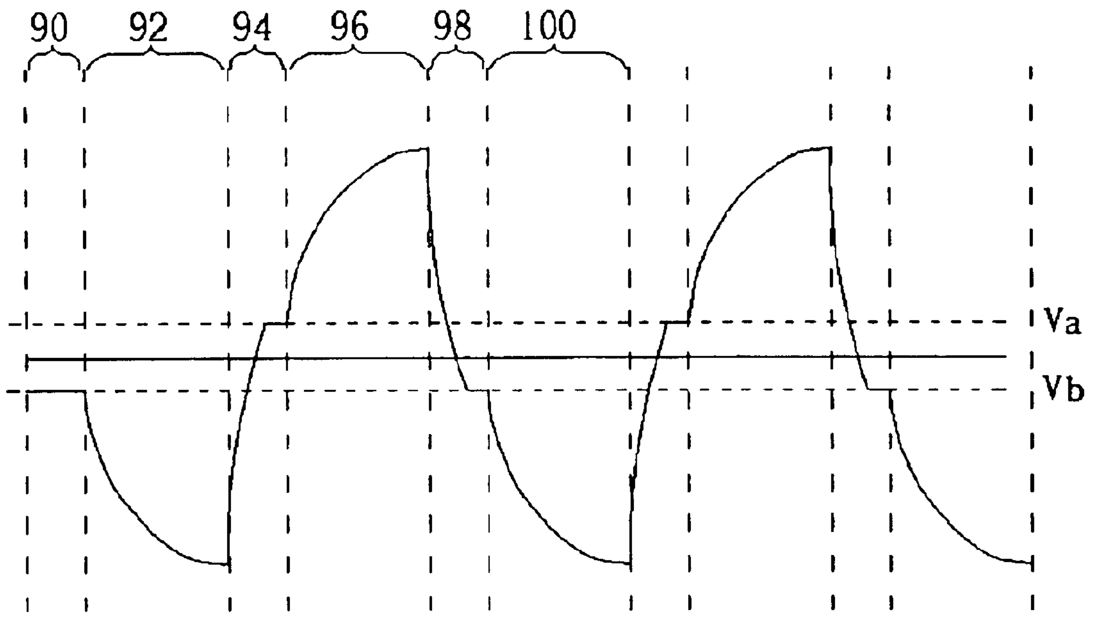
FIG. 12 is an output voltage diagram of the driving circuit driven according to the dot inversion driving method.

Please refer to FIG. 5A, FIG. 5B, and FIG. 12. FIG. 12 is an output voltage diagram of the driving circuit 60 driven according to the dot inversion driving method. During a period 90, the precharge circuit 84 of the negative output buffer 72 drives the pixel 47 located at row 52 and column 48 with the predetermined negative level Vb. During a period 92, the output buffer 85 of the negative buffer circuit 72 pulls down the voltage level from Vb toward a target voltage level. During a period 94, the precharge circuit 82 of the positive buffer circuit 70 drives the pixel 47 located at row 54 and column 48 with the predetermined positive level Va. During a period 96, the output buffer 83 pulls up the voltage level from Va toward a target voltage level. During a period 98, the precharge circuit 84 of the negative buffer circuit 72 drives the pixel 47 located at row 56 and column 48 with the predetermined negative level Vb. During a period 100, the output buffer 85 pulls down the voltage level from Vb toward a target voltage level. As mentioned above, the precharge circuit 82 is used for clamping the voltage level of the pixel at the predetermined positive level Va. Then, the output buffer 83 pulls up the voltage level of the pixel from Va to a target voltage level. Similarly, the precharge circuit 84 is used for clamping the voltage level of the pixel at the predetermined negative level Vb. Then, the output buffer 85 pulls down the voltage level of the pixel from Vb to a target voltage level.

In the preferred embodiment, the prior art dot inversion driving method without using precharge circuits is suitable for the driving circuit 60. The driving circuit 60 does not need to use the precharge circuit 82 for clamping the voltage level of the pixel at the predetermined positive level Va and the precharge circuit 84 for clamping the voltage level of the pixel at the predetermined negative level Vb. However, the driving circuit 60 can directly use the output buffer 83 in the positive buffer circuits 70 for driving pixels 47 with the same positive polarity and the output buffer 85 in the negative buffer circuit 72 for driving pixels 47 with the same negative polarity. The effect related to the dot inversion driving method is also achieved.

Figure 13:
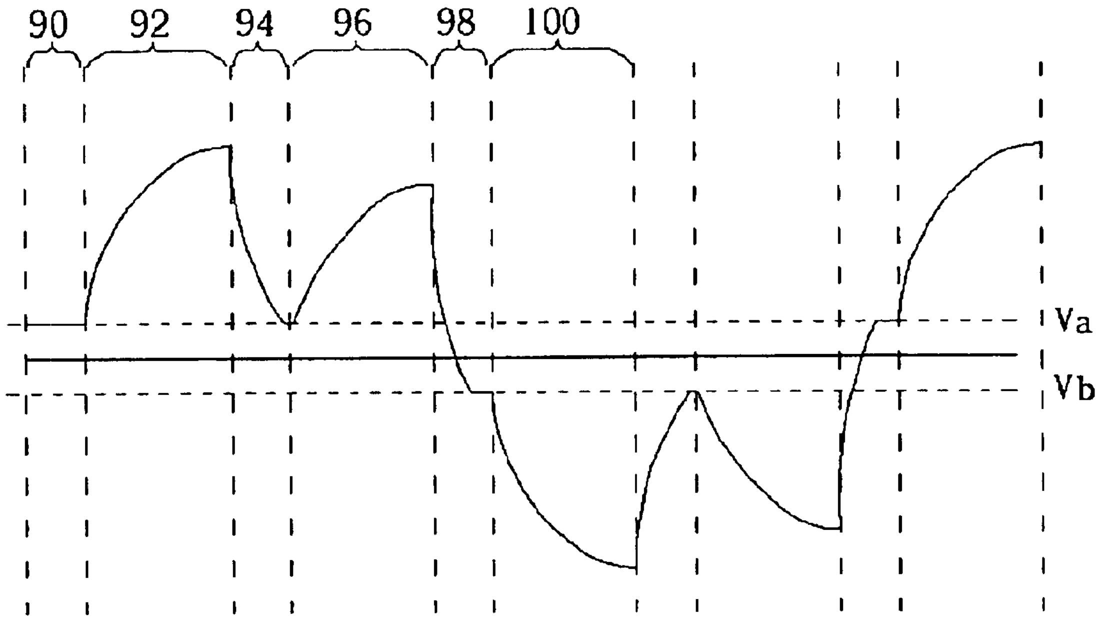
FIG. 13 is an output voltage diagram of the driving circuit driven according to the dot inversion driving method.

Please refer to FIG. 13, which is an output voltage diagram of the driving circuit 60 driven according to the two-dot inversion driving method. During a period 90, the precharge circuit 82 of the positive buffer circuit 70 drives the pixel 47 located at row 50 and column 48 with the predetermined positive level Va. During a period 92, the output buffer 83 in the positive buffer circuit 70, provided to drive the pixel (50,48), pulls up the voltage level from Va toward a target voltage level. During a period 94, the precharge circuit 82 of the positive buffer circuit 70 drives the pixel 47 located at row 52 and column 48 with the predetermined positive level Va. During a period 96, the output buffer 83 provided to drive the pixel (52,48) pulls up the voltage level from Va toward a target voltage level. During a period 98, the precharge circuit 84 of the negative output buffer 72 drives the pixel 47 located at row 54 and column 48 with the predetermined negative level Vb. During a period 100, the output buffer 85 of the negative buffer circuit 72, provided to drive the pixel (54,48), pulls down the voltage level from Vb toward a target voltage level. As mentioned above, the precharge circuit 82 is used for clamping the voltage level of the pixel at the predetermined positive level Va. Then, the output buffer 83 pulls up the voltage level of the pixel from Va to a target voltage level. Similarly, the precharge circuit 84 is used for clamping the voltage level of the pixel at the predetermined negative level Vb. Then, the output buffer 85 pulls down the voltage level of the pixel from Vb to a target voltage level. Therefore, the precharge circuits 82, 84 make the corresponding positive buffer circuit 70 and the negative buffer circuit 72 function as class-AB operational amplifiers to do push-pull operations on voltages of the pixels. In other words, the preferred embodiment uses the output buffers 83, 85 and the corresponding precharge circuits 82, 84 to achieve the objective of driving pixels according to the two-dot line inversion driving method.

Please note that the driving circuit 60 shown in FIG. 9 uses two buffer circuits 70, 72 for respectively driving positive and negative voltage levels. The driving circuit 60 can adopt only one buffer circuit, the buffer circuit 70 for example, to achieve the same objective of driving pixels. The precharge circuit is used for selectively providing the predetermined voltage level Va, Vb according to a specific driving method. The output buffer that is a class-A operational amplifier selectively pushes down and pulls up the voltage level used for driving the pixels with regard to the specific driving method. Accordingly, operation of the driving circuit with one buffer circuit is identical to the abovedmentioned operation of the driving circuit 60 with two buffer circuits 70, 72. In other words, the output voltage diagrams of the dot inversion driving method and the two-dot line inversion driving method related to one buffer circuit are respectively shown in FIG. 12 and FIG. 13.

As shown in FIG. 12 and FIG. 13, the voltage transition between two opposite polarities will first clamped at the predetermined voltage level Va or Vb. For example, the voltage are prepared to approach a positive level from a negative level during period 94 in FIG. 12, but the voltage is clamped at Va. The driving circuit 60 with two buffer circuits or one buffer circuit is capable of generating voltage transition between two voltages with opposite polarities directly to achieve the same objective of driving pixels. That is, no voltage clamping occurs during the periods 94, 98 shown in FIG. 12, and the period 98 shown in FIG. 13, and the pixels are properly driven under this operation mode. The precharge circuit, therefore, is only activated when the detector 61 acknowledges that the polarity statuses associated with two adjacent pixels are the same. To sum up, the precharge circuit is used for clamping voltage at Va or Vb only when the pixels are driven according to the two-dot line inversion driving method (period 94 shown in FIG. 13 for example).

In contrast to the prior art, the driving circuit of the LCD monitor according to the present invention adopts precharge circuits such as source followers to provide a predetermined positive level and a predetermined negative level and two output buffers which are class-A operational amplifiers to drive pixels having the positive polarity and pixels having the negative polarity respectively. Then, the output buffer that is a class-A operational amplifier is successively applied to driving pixels according to the two-dot line inversion driving method. In addition, the driving circuit according to the present invention has many advantages such as simple circuit layout and great power efficiency owing to the output buffers that are class-A operational amplifiers.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A driving method of a liquid crystal display (LCD) monitor, the LCD monitor comprising:

an LCD panel for displaying a plurality of pixels arranged in a matrix format;

a positive buffer circuit for driving the pixels with a positive voltage;

a negative buffer circuit for driving the pixels with a negative voltage;

a detector for receiving a horizontal synchronization signal and a polarity signal, and for comparing states of the polarity signal at two successive triggers of the horizontal synchronization signal; and a controller connected to the detector, the positive buffer circuit, and the negative buffer circuit for controlling operation of the positive buffer circuit and the negative buffer circuit according to an output of the detector;

the driving method comprising:

using the controller to control either the positive buffer circuit or the negative buffer circuit for driving two adjacent pixels, which are located in the same column but different rows on the LCD panel corresponding to the two successive triggers of the horizontal synchronization signal, with voltages of the same polarity when the detector detects that states of the polarity signal at two successive triggers of the horizontal synchronization signal are the same so that the positive buffer circuit continuously drives the pixels with the positive voltage and the negative buffer circuit continuously drives the pixels with the negative voltage; and using the controller to control the positive buffer circuit and the negative buffer circuit for driving two adjacent pixels, which are located in the same column but different rows on the LCD panel corresponding to two successive triggers of the horizontal synchronization signal, with voltages of opposite polarities when the detector detects that two states of the polarity signal at two successive triggers of the horizontal synchronization signal differ.

2. The driving method of claim 1 wherein the pixel to be driven with a positive voltage is precharged to a predetermined positive level before being driven, and the pixel to be driven with a negative voltage is precharged to a predetermined negative level before being driven.

3. The driving method of claim 2 wherein the positive buffer circuit comprises a first precharge circuit for providing the predetermined positive level, and the negative buffer circuit comprises a second precharge circuit for providing the predetermined negative level.

4. The driving method of claim 3 wherein the first precharge circuit and the second precharge circuit are source followers.

5. The driving method of claim 1 wherein the detector comprises two latch circuits for holding the corresponding states of the polarity signal at two successive triggers of the horizontal synchronization signal, and a logic circuit for comparing two states of the polarity signal at two successive triggers of the horizontal synchronization signal.

6. The driving method of claim 1 wherein each of the positive buffer circuit and the negative buffer comprises a class-A operational amplifier buffer for driving pixels.

7. A liquid crystal display (LCD) monitor comprising: an LCD panel for displaying a plurality of pixels arranged in a matrix format;

a positive buffer circuit for driving the pixels with a positive voltage;

a negative buffer circuit for driving the pixels with a negative voltage;

a detector for receiving a horizontal synchronization signal and a polarity signal, and for comparing states of the polarity signal at two successive triggers of the horizontal synchronization signal; and a controller connected to the detector, the positive buffer circuit, and the negative buffer circuit for controlling operation of the positive buffer circuit and the negative buffer circuit according to an output of the detector;

wherein the controller controls either the positive buffer circuit or the negative buffer circuit for driving two adjacent pixels, which are located in the same column but different rows on the LCD panel corresponding to the two successive triggers of the horizontal synchronization signal, with voltages of the same polarity when the detector detects that states of the polarity signal at two successive triggers of the horizontal synchronization signal are the same so that the positive buffer circuit continuously drives the pixels with the positive voltage and the negative buffer circuit continuously drives the pixels with the negative voltage, and the controller controls the positive buffer circuit and the negative buffer circuit for driving two adjacent pixels, which are located in the same column but different rows on the LCD panel corresponding to two successive triggers of the horizontal synchronization signal, with voltages of opposite polarities when the detector detects that two states of the polarity signal at two successive triggers of the horizontal synchronization signal differ.

8. The liquid crystal display monitor of claim 7 wherein the pixel to be driven with a positive voltage is precharged to a predetermined positive level before being driven, and the pixel to be driven with a negative voltage is precharged to a predetermined negative level before being driven.

9. The liquid crystal display monitor of claim 8 wherein the positive buffer circuit comprises a first precharge circuit for providing the predetermined positive level, and the negative buffer circuit comprises a second precharge circuit for providing the predetermined negative level.

10. The liquid crystal display monitor of claim 9 wherein the first precharge circuit and the second precharge circuit are source followers.

11. The liquid crystal display monitor of claim 7 wherein the detector comprises two latch circuits for holding the corresponding states of the polarity signal at two successive triggers of the horizontal synchronization signal, and a logic circuit for comparing two states of the polarity signal at two successive triggers of the horizontal synchronization signal.

12. The liquid crystal display monitor of claim 7 wherein each of the positive buffer circuit and the negative buffer circuit comprises a class-A operational amplifier buffer for driving the pixels.

13. A driving circuit of a liquid crystal display (LCD) monitor, the LCD monitor comprising an LCD panel for displaying a plurality of pixels arranged in a matrix format, the driving circuit comprising:

a positive buffer circuit for driving the pixels with a positive voltage;

a negative buffer circuit for driving the pixels with a negative voltage;

a detector for receiving a horizontal synchronization signal and a polarity signal, the detector comprising:

two latch circuits for holding the corresponding states of the polarity signal at two successive triggers of the horizontal synchronization signal; and a logic circuit for comparing two states of the polarity signal at two successive triggers of the horizontal synchronization signal; and a controller connected to the detector, the positive buffer circuit, and the negative output buffer for controlling operation of the positive buffer circuit and the negative buffer circuit according to an output of the detector;

wherein the controller controls either the positive buffer circuit or the negative buffer circuit for driving two adjacent pixels, which are located in the same column but different rows on the LCD panel corresponding to the two successive triggers of the horizontal synchronization signal, with voltages of the same polarity when the detector detects that states of the polarity signal at two successive triggers of the horizontal synchronization signal are the same so that the positive buffer circuit continuously drives the pixels with the positive voltage and the negative buffer circuit continuously drives the pixels with the negative voltage, and the controller controls the positive buffer circuit and the negative buffer circuit for driving two adjacent pixels, which are located in the same column but different rows on the LCD panel corresponding to two successive triggers of the horizontal synchronization signal, with voltages of opposite polarities when the detector detects that two states of the polarity signal at two successive triggers of the horizontal synchronization signal differ.

14. The driving circuit of claim 13 wherein the pixel to he driven with a positive voltage is precharged to a predetermined positive level before being driven, and the pixel to be driven with a negative voltage is precharged to a predetermined negative level before being driven.

15. The driving circuit of claim 14 wherein the positive buffer circuit comprises a first precharge circuit for providing the predetermined positive level, and the negative buffer circuit comprises a second precharge circuit for providing the predetermined negative level.

16. The driving circuit of claim 15 wherein the first precharge circuit and the second precharge circuit are source followers.

17. The driving circuit of claim 13 wherein each of the positive buffer circuit and the negative buffer circuit comprises a class-A operational amplifier buffer for driving the pixels.

* * * * *